(12) United States Patent
Bennett (10) Patent No.: US 7,735,323 B2
(45) Date of Patent: Jun. 15, 2010

(54) SOLAR THERMAL POWER SYSTEM

(75) Inventor: Charles L. Bennett, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 65 days.

(21) Appl. No.: 12/030,065

(22) Filed: Feb. 12, 2008

(65) Prior Publication Data

US 2009/0199557 A1 Aug. 13, 2009

(51) Int. Cl.
*B60K 16/00* (2006.01)
*B60L 8/00* (2006.01)
*F03G 6/00* (2006.01)
*F01K 13/00* (2006.01)
*F01K 23/06* (2006.01)
*F22D 1/28* (2006.01)
*F22D 1/46* (2006.01)
*F16T 1/00* (2006.01)

(52) U.S. Cl. ............... 60/641.8; 122/442; 122/488; 122/489; 60/645; 60/670

(58) Field of Classification Search .......... 60/641.8, 60/641.11, 641.15; 126/634, 635, 640, 683, 126/684, 688–695, 698–700; 122/506, 442, 122/509
See application file for complete search history.

(56) References Cited

U.S. PATENT DOCUMENTS 1,410,805 A * 3/1922 Haag .......................... 122/457

(Continued)

FOREIGN PATENT DOCUMENTS

DE 102006022792 5/2006

(Continued)

OTHER PUBLICATIONS

Zarza "Overview on Direct Steam Generation (DSG) and Experience at the Platforma Solar de Almeria (PSA)" 2007 Parabolic Trough Workshop, Mar. 8, 2007.

(Continued)

*Primary Examiner*—Thomas E Denion
*Assistant Examiner*—Christopher Jetton
(74) *Attorney, Agent, or Firm*—James S. Tak (57) ABSTRACT

A solar thermal power generator includes an inclined elongated boiler tube positioned in the focus of a solar concentrator for generating steam from water. The boiler tube is connected at one end to receive water from a pressure vessel as well as connected at an opposite end to return steam back to the vessel in a fluidic circuit arrangement that stores energy in the form of heated water in the pressure vessel. An expander, condenser, and reservoir are also connected in series to respectively produce work using the steam passed either directly (above a water line in the vessel) or indirectly (below a water line in the vessel) through the pressure vessel, condense the expanded steam, and collect the condensed water. The reservoir also supplies the collected water back to the pressure vessel at the end of a diurnal cycle when the vessel is sufficiently depressurized, so that the system is reset to repeat the cycle the following day. The circuital arrangement of the boiler tube and the pressure vessel operates to dampen flow instabilities in the boiler tube, damp out the effects of solar transients, and provide thermal energy storage which enables time shifting of power generation to better align with the higher demand for energy during peak energy usage periods.

21 Claims, 4 Drawing Sheets

U.S. PATENT DOCUMENTS

| | | | | |
|---|---|---|---|---|
| 2,066,401 | A | * | 1/1937 | Hartmann .................... 122/33 |
| 4,183,331 | A | * | 1/1980 | Hull .......................... 122/442 |
| 4,192,144 | A | * | 3/1980 | Pierce ....................... 60/641.8 |
| 4,213,303 | A | | 7/1980 | Lane |
| 4,391,100 | A | | 7/1983 | Smith et al. |
| 4,508,493 | A | | 4/1985 | OHare et al. |
| 5,199,263 | A | * | 4/1993 | Green et al. ................. 60/670 |
| 6,062,029 | A | | 5/2000 | Doe et al. |
| 6,301,893 | B1 | | 10/2001 | Luo |
| 6,360,542 | B1 | | 3/2002 | Luo et al. |
| 6,557,500 | B1 | * | 5/2003 | Schroeder .................. 122/7 R |
| 6,996,988 | B1 | * | 2/2006 | Bussard ..................... 60/641.8 |
| 2006/0174622 | A1 | | 8/2006 | Skowronski |

FOREIGN PATENT DOCUMENTS

| | | |
|---|---|---|
| EP | 59107144 | 6/1984 |
| JP | 59-107144 A | 6/1984 |
| NL | 1033563 | 3/2007 |
| WO | 2007104080 A1 | 9/2007 |

OTHER PUBLICATIONS

Valenzuela et al. "Direct Steam Generation in Solar Boilers" IEEE Control Systems Magazine, Apr. 2004.

Zarza et al. "The DISS Project: Direct Steam Generation in Parabolic Troughs Operations and Maintenance Experience Update on Project Status", Proceedings of Solar Forum 2001, Apr. 21-25, 2001, published 2001 by ASME.

Argarwal "A Utility's Perspective: Procuring Renewable Energy" Mar. 8, 2007.

Muller, "Test loop for research on direct steam generation in parabolic trough power plants", Solar Energy Materials, 24 Nos. 1/4, 8 pages (Dec. 24, 1991).

\* cited by examiner

SOLAR THERMAL POWER SYSTEM

I. FEDERALLY SPONSORED RESEARCH OR DEVELOPMENT

The United States Government has rights in this invention pursuant to Contract No. W-7405-ENG-48 between the United States Department of Energy and the University of California for the operation of Lawrence Livermore National Laboratory.

II. FIELD OF THE INVENTION

This invention relates to power generation systems. In particular, the invention relates to a solar thermal power plant using solar heat energy in a direct steam generation (DSG) process, wherein a liquid phase of a phase changing fluid (e.g. water) is provided by a pressure vessel to a boiler tube where concentrated solar radiation heating takes place, and a gaseous phase of a phase changing fluid (e.g. steam) is cycled back to the pressure vessel, so as to enable flow control under rapidly varying solar heating transients and two-phase working fluid instability conditions, and to enable heat energy storage in the pressure vessel for later use in the production of electrical or mechanical power as well as space/water heating.

III. BACKGROUND OF THE INVENTION

Solar thermal power plants and systems using DSG processes are known for use in various applications, including for example powering a steam turbine and generating electricity. DSG systems typically use solar concentrators or collectors, such as parabolic trough collectors or dish collectors known in the art, to focus solar radiation onto a vessel or tube in which, for example, water is flowed or otherwise present, to heat the water into steam. In such systems, work is then typically produced by expanding the steam in an expander, such as a turbine, after which the working fluid may be condensed in a condenser for recirculation in the case of closed systems, or expelled in the case of open systems.

One example of a closed system solar power generator using a DSG-like process is disclosed in U.S. Pat. No. 4,391,100 to Smith, with a solar concentrator 40 directly illuminating water 11 contained in a globular boiler 10 by focusing sunlight through lens 44 of the boiler. Steam from this boiler then powers a turbine 25 to generate electricity. Spent steam from turbine 25 is then condensed into water at radiator 29 and condenser 30, and subsequently collected at reservoir 32. The higher elevation of the water in the reservoir relative to a second turbine 35 is used to turn the second turbine and generate electricity. Water emerging from the second turbine is then returned to the globular boiler through a check valve.

A more modern example of a solar thermal power system using a DSG process is discussed in the article "Direct Steam Generation in Solar Boilers" by L. Valenzuela et al, published in IEEE Control Systems Magazine. Here the authors describe the relatively complex control systems needed in all three approaches to DSG, the once-through mode, the injection mode, and the recirculation mode. In each case, concentrated sunlight is focused onto substantially horizontal tubular boilers that lie along the axis of a parabolic trough mirror. A mixture of gaseous and liquid phase water, i.e. steam, is produced and after super-heating to purely gas phase is provided to a steam turbine for the generation of electricity. According to these authors, "the investment costs and complexity of the once-through mode are lowest, and this mode has the best performance. On the other hand, the once-through mode is not easy to control, requiring a more complex control system." Indeed, these authors needed to implement a set of four control loops for the once-through mode.

The difficulty of controlling DSG systems stems from the combined effects of predictable variations in solar illumination through the diurnal cycle, the unpredictable variations produced by transients from passing clouds or other obscurations, and the effects of the fundamental two-phase fluid flow Ledinegg instability. As is known in the art, as heat is applied to a conventional boiler tube, there is a tendency for the boiling water to "chug and spit" in an irregular and unstable fashion as it boils. This fluid flow instability causes the familiar gurgling and sputtering noises often heard in coffee percolators. The combination of fluid flow instability and solar transients tends to have as a consequence the formation of potentially damaging "hot spots" along the boiler tube. The origin of this so-called Ledinegg instability is due to the tendency for a sudden, rapid increase in the liquid flow rate as bubbles of gas phase steam are produced and tend to propel uncontrolled "slugs" of liquid water at high speed along the flow direction.

Another issue known in the art is the lack of suitable thermal energy storage technology for DSG processes and systems In a presentation at the Parabolic Trough Workshop in Denver in 2007, "Overview on Direct Steam Generation (DSG) and Experience at the Plataforma Solar de Almeria (PSA)", Zarza states that a suitable thermal energy storage technology for DSG is still to be developed. One of the most significant motivations for the use of thermal energy storage in connection with a solar thermal power plant is that, whereas the maximum solar flux typically occurs at near noon, the maximum electric power consumption typically occurs about four hours later. The greatest burden on the electric power grid occurs during these times of greatest electricity consumption. This burden is especially great for the sunniest, hottest days of the summer months. The economic manifestation of this phenomenon is that the market value of electric power is greater during periods of peak need. For example, in the Mar. 8, 2007 publication entitled, "A Utility's Perspective, Procuring Renewable Energy" published by the Pacific Gas and Electric Company, the multiplier on the market value for electric power between the work day hours of noon and 8 p.m., for the months June through September, is described as being a factor of two. Thus, besides addressing the electric power needs in a more timely manner (when observing the demands on the power grid as a whole), there is in addition, great economic incentive (to the individual consumer) for the incorporation of inexpensive thermal energy storage for solar thermal power plants. In other words, for the individual consumer it is cheaper to produce/consume your own electricity during these peak times, than to buy it.

In summary, there is therefore a need for a DSG type solar thermal power generation system which provides a solution to the problems of solar field control under solar radiation transients and the related problem of the instability of two-phase flow inside the receiver tubes, as well as provides suitable thermal energy storage technology for DSG systems that enables time shifting of the available thermal energy to better align supply with demand.

IV. SUMMARY OF THE INVENTION

One aspect of the present invention includes a solar thermal power generator comprising: a pressure vessel for storing a thermally-induced phase-changing working fluid; a boiler tube having an inlet end operably connected to receive a liquid phase of the working fluid from the pressure vessel, and an outlet end operably connected to return a gaseous phase of the working fluid back to the pressure vessel to preheat the liquid phase working fluid contained therein; a solar concentrator for concentrating solar energy on the boiler tube to thermally induce a phase change of the working fluid therein from the liquid phase to the gaseous phase; an expander operably connected to the pressure vessel to produce work using the gaseous phase working fluid received therefrom; a condenser operably connected to the expander to condense the expanded working fluid received therefrom; and a collection vessel operably connected to the condenser to collect the condensed working fluid received therefrom, and operably connected to the pressure vessel to supply the collected working fluid back thereto.

Another aspect of the present invention includes a solar thermal power generator comprising: a pressure vessel for storing a thermally-induced phase-changing working fluid; a boiler tube having an inlet end operably connected to receive a liquid phase of the working fluid from the pressure vessel, and an outlet end operably connected to return a gaseous phase of the working fluid back to the pressure vessel to preheat the liquid phase working fluid contained therein; a solar concentrator for concentrating solar energy on the boiler tube to thermally induce a phase change of the working fluid therein from the liquid phase to the gaseous phase; an expander operably connected to the pressure vessel to produce work using the gaseous phase working fluid received therefrom; a condenser operably connected to the expander to condense the expanded working fluid received therefrom; a collection vessel operably connected to the condenser to collect the condensed working fluid received therefrom, and operably connected to the pressure vessel to supply the collected working fluid back thereto; and at least one of a flow restrictor operably connected inline between the pressure vessel and the inlet end of the boiler tube, and a wick positioned in the boiler tube, for dampening flow instability in the boiler tube.

Another aspect of the present invention includes a solar thermal power generator comprising: a pressure vessel for storing a thermally-induced phase-changing working fluid; a boiler tube having an inlet end operably connected to receive a liquid phase of the working fluid from the pressure vessel, and an outlet end operably connected to return a gaseous phase of the working fluid back to the pressure vessel to preheat the liquid phase working fluid contained therein; a first fluid conduit fluidically connected to channel gaseous-phase working fluid from the outlet end of the boiler tube to below a pre-determined liquid-phase working fluid level in the pressure vessel; a second first fluid conduit fluidically connected to channel gaseous-phase working fluid from the outlet end of the boiler tube to above a pre-determined liquid-phase working fluid level in the pressure vessel; a controller for controlling the flow of gaseous phase working fluid from the outlet end of the boiler tube into the pressure vessel either above or below the pre-determined liquid-phase working fluid level in the pressure vessel; a solar concentrator for concentrating solar energy on the boiler tube to thermally induce a phase change of the working fluid therein from the liquid phase to the gaseous phase; an expander operably connected to the pressure vessel to produce work using the gaseous phase working fluid received therefrom; a condenser operably connected to the expander to condense the expanded working fluid received therefrom; and a collection vessel operably connected to the condenser to collect the condensed working fluid received therefrom, and operably connected to the pressure vessel to supply the collected working fluid back thereto.

The present invention is generally directed to a solar thermal power generation system capable of providing a simple efficient solution to the problems of solar field control under solar radiation transients and the related problem of the instability of two-phase flow inside the receiver tubes, and which provides a suitable thermal energy storage technology for DSG processes and systems. In particular, the thermal energy storage solution provided by the solar thermal power system of the present invention also solves both the transient problems and the two-phase instability problems known in the art. The thermal energy storage solution enables the storage of substantially all of the solar heating available before noon for use in the generation of power during the high electric power market value afternoon hours.

Figure 1:
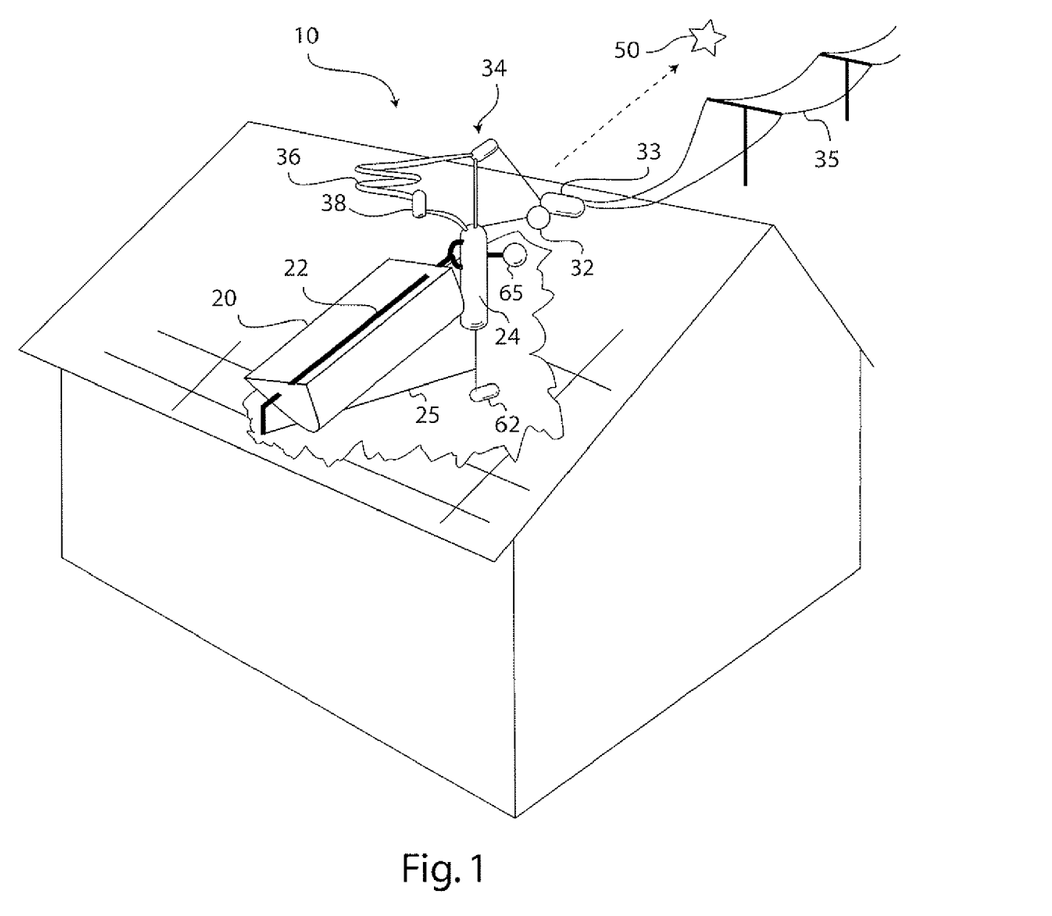
FIG. 1 is a perspective view of an example embodiment of the present invention illustrating an example installation on a building structure, such as a residential dwelling and connected to a distributed power grid.

The main component features of the present invention generally include all elongated boiler tube, a pressure vessel, an expander generator (e.g. a steam engine), a condenser, and a collection vessel or reservoir. As illustrated by the exemplary embodiment shown in FIG. 1, the components are all fluidically connected by conventional means, such as pipes, tubes, or other types of fluidic channels. However, as illustrated in FIG. 1, the boiler tube is connected to the pressure vessel (containing a supply of working fluid) at both the boiler tube inlet and the boiler tube outlet, so that both a liquid phase of a phase-changing working fluid contained in the pressure vessel may be channeled from the pressure vessel to the boiler tube inlet, and a gas phase of the working fluid may be channeled from the boiler tube outlet back to the pressure vessel. In particular, feed working fluid to the boiler tube inlet is supplied from a fluid conduit connected to the bottom of the pressure vessel. The elevations of the boiler tube and pressure vessel may be substantially the same, in which case the working fluid will rise to an equilibrium level within the boiler tube where solar radiation may be concentrated directly thereon. While a water pump or injector would not be needed in these cases, they may be used in other embodiments of the present invention to supply pressurized feed working fluid into the boiler tube where elevational differences between the pressure vessel and boiler tube make operation without such pumps difficult or impractical. Where water is chosen as the working fluid, liquid water is drawn into the boiler tube inlet from the pressure vessel, and steam is channeled out from the boiler tube outlet back to the pressure vessel. For purposes of the following discussion and to illustrate operation of the invention, water is used as the representative phase-changing operating fluid, but is not limited only to such.

At the start of a typical diurnal cycle, the flow of steam produced by solar heating (via a concentrator) in the boiler tube is controlled or otherwise designed to enter the pressure vessel either above the water level in the pressure vessel, below the water level in the pressure vessel, or a combination of both. In the case where entry is below the water level, steam initially merely heats the water in the pressure vessel without significant boiling or pressurization of the water in the vessel. As the water in the pressure vessel tank approaches the design temperature, the pressure in the tank also approaches the design operating pressure. A second channel at the top of the pressure vessel leads to the inlet of the expander and the expander turns the crankshaft of an induction motor which in turn may supply electrical power to an electric grid. In such case, a pressure-activated switch connects the induction motor to the electric grid whenever the pressure in the steam line leading to the expander is above a pre-determined threshold. In this way, the induction motor is connected to the grid only when there is sufficient steam available to produce power. Spent steam from the outlet of the expander is sent to a condenser and liquid water reservoir. As long as significant steam pressure is present, a check valve at the bottom of the condensed water reservoir prevents water from draining from this condensate reservoir. At the end of the day, residual hot water remaining in the pressure vessel is drained through a sump valve into a hot water tank. Once drained of hot water, fresh cold water is admitted to the pressure vessel to cool it, and decrease the residual pressure. Once this residual pressure is decreased sufficiently, the check valve at the bottom of the cold liquid water reservoir opens and releases liquid water from the condensate reservoir back to the pressure vessel. At this point, the system is ready to repeat its diurnal cycle.

V. BRIEF DESCRIPTION OF THE DRAWINGS

The accompanying drawings, which are incorporated into and form a part of the disclosure, are as follows.

VI. DETAILED DESCRIPTION

Figure 2:
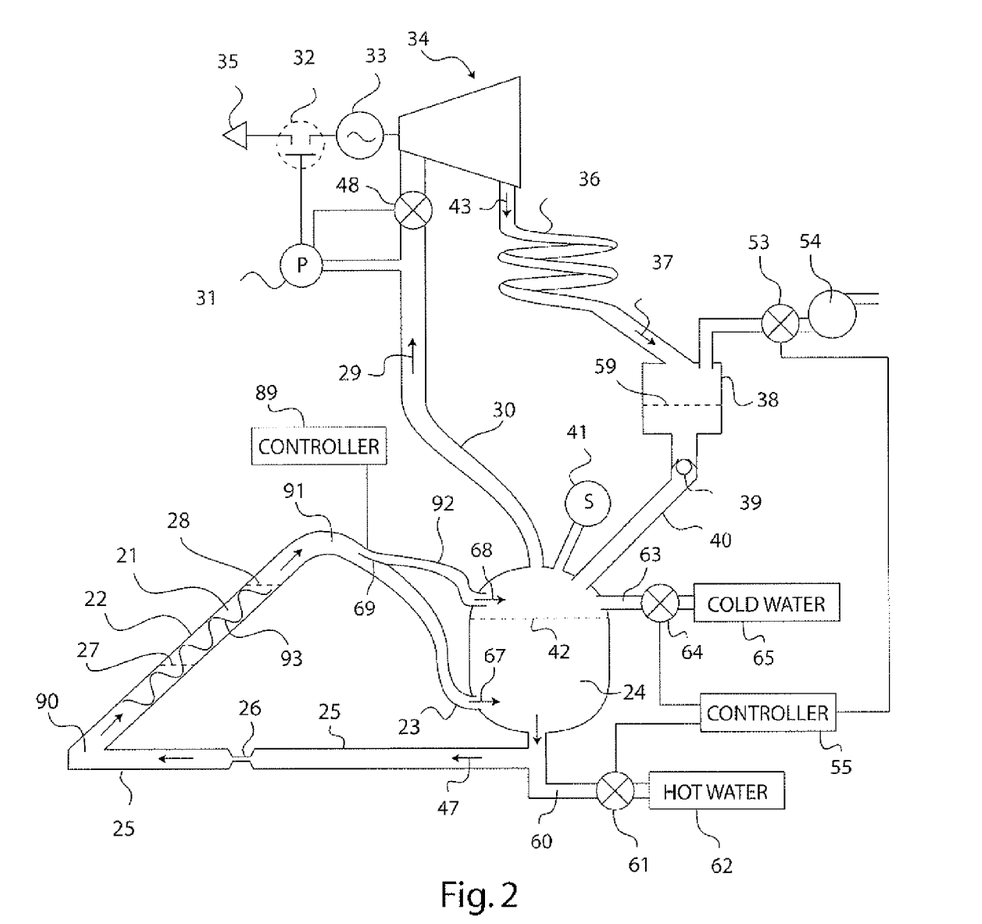
FIG. 2 is a schematic view of the example embodiment of FIG. 1, and illustrating the configuration of the main components (and shown with the solar concentrator removed).

A first example embodiment of the solar thermal power system of the present invention is illustrated in FIGS. 1 and 2, and generally indicated at reference character 10. In particular, FIG. 2 shows a schematic view of an arrangement/configuration of the main components of the system 10, and FIG. 1 shows an illustrative installation of the system on a building structure, such as a residential dwelling. As can be best seen in FIG. 2, the main components of the present invention include a pressure vessel 24, a boiler tube 22, a solar concentrator (20 in FIG. 1), an expander 34, a condenser 36, and a reservoir 38, whose functions and system operations are described next in greater detail.

As shown in FIG. 2, the boiler tube 22 has an inlet end 90 fluidically connected to the pressure vessel (preferably at the bottom of the pressure vessel) via fluid line, duct, or conduit 25, and an outlet end 91 fluidically connected at a different location of the pressure vessel 24 (e.g. at steam inlet duct 23). In this arrangement, the working fluid, which may simply be water, stored in the pressure vessel in a liquid phase is provided to the inlet end of the boiler tube, and returned back to the pressure vessel from the outlet end of the boiler tube in a gaseous phase. In FIG. 2, the boiler tube and the pressure vessel are shown positioned at substantially the same elevation as each other. However, as previously mentioned in the Summary, this need not be the case where a pump 56 or injector is used to feed water into the boiler tube 22 (see FIG. 3). Furthermore, FIG. 2 also shows an optional feature of a steam-apportioning switch 69 controlled by flow controller 89, and located downstream of the outlet end 91 of the boiler tube 22 and which dispenses the flow of steam between steam inlet duct 23 and steam inlet duct 92, as indicated by steam flows 67 and 68, respectively. The steam inlet ducts 23 and 92 are shown with duct 23 leading into the vessel 24 below the water line 42 and duct 92 leading into the vessel 24 above the water line 42.

In addition to the boiler tube 22 and the pressure vessel 24, another main component of the system 10 includes a solar concentrator (20 in FIG. 1) that is positioned to focus solar radiation on the boiler tube 22 and heat the working fluid therein. Various types of solar collector known in the art may be used, such as for example the parabolic trough solar collector shown in FIG. 1, which has a length in the longitudinal direction of its focal axis and a parabolic curve cross-section with a reflective inner surface that focuses sunlight on a focal axis that is coaxial with the boiler tube. As can be seen in FIG. 2, the boiler tube 22 may be positioned to have an inclined orientation, with the outlet end 91 positioned at a higher elevation than the inlet end 90. Furthermore, as can be seen in FIG. 1, a trough-type solar collector may also be angled to align the focal axis of the collector with the inclined boiler tube 22. The details of the construction and orientation of the concentrating mirror system are described in co-pending U.S. patent application Ser. No. 11/543,659, entitled "Residential Solar Thermal Power Plant," hereby incorporated by reference. In particular, the axis of concentrating mirror 20 (and the boiler tube 22) is preferably oriented parallel to the Earth's rotation axis, so that in the Northern hemisphere, it is inclined towards the North Star 50. The angle of inclination of boiler tube 22 relative to a local horizontal plane is thus equal to the local angle of latitude.

A wick 93 of a type known in the art of heat pipes, is also shown in FIG. 2, and may be placed in the boiler tube 22 to draw liquid phase working fluid into the boiler tube, and to distribute the working fluid evenly around the circumference and along the length of boiler tube 22 so as to facilitate boiling without the chugging and spitting described above. Such wicks typically consist of a porous medium such as a rolled up mesh screen of stainless steel. Alternative to or in combination with the wick 93, a flow restrictor 26 is also shown located along the length of flow duct 25 and comprised of a narrow tube section thereof, and is of a type known in the art of tubular boilers for conventional steam power plants. It is also appreciated that in the case where the maximum level of turbulent mixing and heating of the water within vessel 24 is desired, both wick 93 and flow restrictor 26 may be eliminated, in order to promote the turbulent stirring of the water in pressure vessel 24.

A steam channel 30 is also fluidically connected to the top headspace of pressure vessel 24 and leads upwards to the inlet of expander 34. The upward orientation of channel 30 assures that liquid condensed on the walls of the channel drip back down into vessel 24. An electric induction motor/generator 33 may be mechanically connected to the expander 34 as shown in FIG. 2. An exemplary control mechanism is shown illustrating the manner of establishing connection to an electrical power grid. In particular, motor 33 is connected through pressure-activated switch 32 to the electrical power grid by wires 35. Pressure transducer 31 responds to pressure in steam conduit 30 by closing switch 32 and opening expander inlet valve 48 as long as the pressure is above a pre-determined level sufficient to enable proper operation of expander 34.

A condenser 36 is shown fluidically connected to the outlet of expander 34 and channels condensed liquid working fluid into low-pressure reservoir 38. Liquid accumulating in reservoir 38 is prevented from draining into liquid drain conduit 40 by check valve 39 located below the bottom of reservoir 38, as long as the pressure in conduit 40 is above a pre-determined threshold value that is lower than the threshold value for transducer 31. A vacuum pump 54 for removing excess air is fluidically connectable to the upper portion of reservoir 38 by opening valve 53.

Fresh, cold, re-supply feed water provided from a reservoir 65 may be admitted to pressure vessel 24 by the opening of feed valve 64. The feed valve is operably connected to the pressure vessel and operably connectable to an external source of the working fluid for controlling the influx of working fluid into the pressure vessel. At the end of the day, residual hot water within pressure tank 24 is drained through sump conduit 60 to a hot water tank 62 by the opening of tap valve 61. The tap valve is operably connected to the pressure vessel for controlling the release of working fluid therefrom. Based on the needs for excess air removal, water re-supply, and the available level of solar heating for the day, a controller 55 of a type known in the art, is provided to govern the action of valves 53, 64 and 61 respectively. In particular, the controller 55 is shown operably connected to the tap valve 61 and the feed valve 64 to coordinate operations thereof.

The operation of the embodiment shown in FIG. 2 is as follows. At the beginning of a typical diurnal cycle, at some time near sunrise, essentially all of the water in the system resides in pressure vessel 24. In this embodiment, with a hermetically sealed system, the vapor pressure of the water throughout the system is very low. In the case that residual gas has built up in the system, either because of small leaks or because of dissolved air carried in with the cold feed water from reservoir 65, vacuum pump 54 may be briefly engaged with valve 53 open, in order to pump away the residual gas.

As the sun rises and sunlight concentrated by concentrator mirror 20 heats boiler tube 22, water within boiler tube 22 begins to warm and soon after begins to boil. Steam flows out of the outlet end 91 of the boiler tube 22, through one or both of the inlet ducts 23, 92 and into the interior of pressure vessel 24. The choice of directing steam into one or both of the inlet ducts 23, 92 is made possible by the steam-apportioning switch 69 controlled by flow controller 89, and located downstream of the outlet end 91 of the boiler tube 22. The switch 69 enables flexible control over the degree of working pressure steam delivered to the power generation system by either channeling steam flow 68 (via duct 92) into the steam conduit 30 (via the vessel headspace) without passing below the water level 42 within the pressure vessel 24, or channeling steam flow 67 (via inlet duct 23) into the pressure vessel 24 below the water level 42 to thereby heat the water directly, or both 67, 68. It is appreciated that steam flow 68 via duct 92 also heats the water, albeit indirectly at the surface. In this manner, the water is preheated in either case prior to being heated in the boiler tube into a gaseous phase. In this way, the boiler tube 22 is prevented from overheating, and the quantity of steam produced is in proportion to the intensity of the available concentrated sunlight.

In the case where steam flow 67 through duct 23 is entered below the water level 42, initially, with the temperature of the water in vessel 24 below the design operating temperature, the incoming gaseous steam 67 is very quickly condensed to liquid and its heat is transferred to the water in vessel 24. The incoming steam flow 67 will actively and efficiently stir and preheat the water in vessel 24, and the temperature of this water becomes nearly uniform.

In the case where steam flow 68 through duct 92 is entered above the water level 42 and channeled directly to the expander, a certain degree of super-heating of steam tends to occur even at the beginning of the day, and the temperature and pressure of steam flow 29 tends to gradually increase throughout the afternoon. In this case, heat transfer into the water is purposefully inefficient in that preheating of the water occurs only at the surface, but power is produced starting very shortly after sunrise, and continues approximately in proportion to the available sunlight throughout the day. In some applications, this may be the preferred mode of operation for the present invention. It is appreciated that while two inlet ducts 23, 92 are used to control the heat transfer parameters from the steam to the water as shown in FIG. 2, in an alternative, the initial water level 42 itself in the pressure vessel 24 may be adjusted, such that it is above the level of incoming steam at an early stage for purposes of heating the water, and after some of the water has been converted to steam and provided to the expander, below the level of incoming steam at a later stage, for direct channeling of steam to the expander for power generation, as shown best in FIG. 3. In this mode of operation, the delay between the onset of daily solar heating and the maximum electric power generation may be tailored to best match the local energy consumption requirements by adjusting the initial height of water level 42 relative to the height of steam inlet duct 23.

Various alternative means to initially draw in or otherwise provide liquid working fluid in the boiler tube 22 to be heated, as well as provide the motive pumping action of the working fluid in the fluidic circuit once the present invention starts operation, may be used in the present invention. Properly designed, these means and methods operate to substantially reduce and/or eliminate the problems of two-phase instability and produce a smooth clockwise flow. Under these desired operating conditions, a fairly stable level 27, corresponding to very wet, saturated steam at the onset of boiling, is formed in a lower portion of boiler tube 22, and a level 28 corresponding to dry, saturated steam at the completion of boiling, is formed in an upper portion of tube 22.

Figure 3:
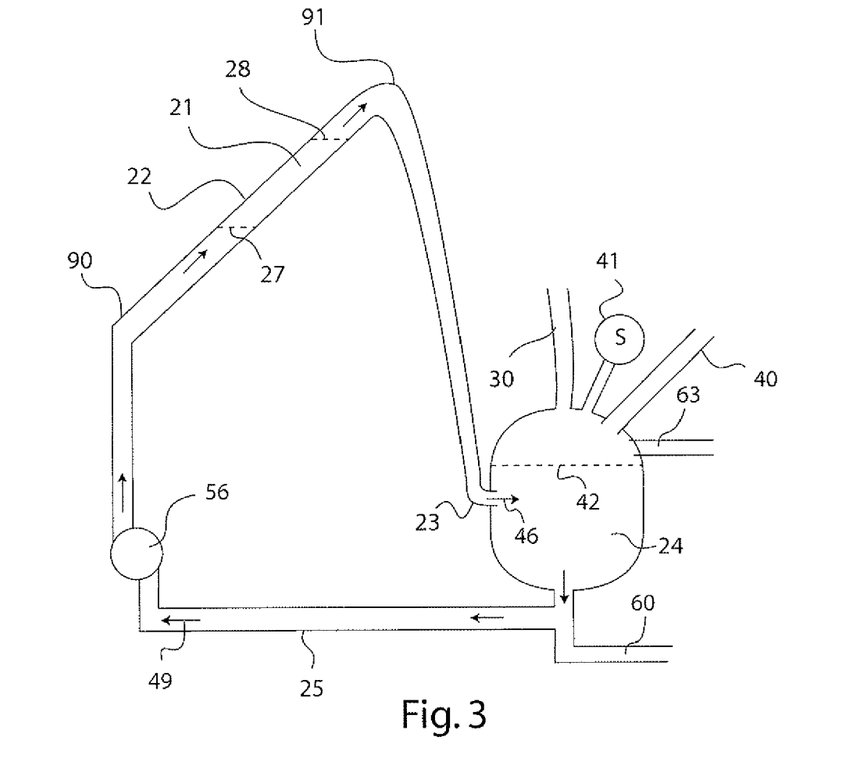
FIG. 3 is a schematic view of a second example embodiment of the present invention, with the boiler tube located at a higher elevation than the pressure vessel.

One method of flowing working fluid into the boiler tube 22 is the incorporation of a pump 56, as shown in FIG. 3, which is particularly useful in the case of a large elevational difference between the elevation of boiler tube 22 and the elevation of pressure vessel 24. Operation of the pump 56 drives water into the boiler tube 22 through the bottom inlet end 90 where it is heated by concentrated solar radiation. In this case, the maximum flow speed provided by pump 56, is preferably no more than that required under maximum solar heating conditions. There is little harm in having some slight excess in pumping speed, other than a slight loss of efficiency, as excess liquid provided to the top of the heating tube simply returns to the pressure vessel 24. In this manner, as shown by the arrows in FIG. 3, a clockwise flow of working fluid is produced from the bottom inlet end 90 of boiler tube 22 to the top outlet end 91 of boiler tube 22 to the inlet conduit 23 into the pressure vessel 24, out through fluid duct 25 and back to the bottom of boiler tube 22.

Another method of flowing working fluid into the boiler tube 22 is to use a wick (such as 93 in FIG. 2) positioned in the boiler tube 22 to wick or draw in liquid phase working fluid into the boiler tube 22 to be heated by concentrated solar radiation, and contribute (in part) to the circuital flow through and between the pressure vessel 24 and the boiler tube 22. Moreover, the wick 93 also functions (preferably in conjunction with a flow restrictor 26 and/or the exemplary inclined orientation of the boiler tube 22 in the present invention), to control and ameliorate vigorous and potentially unstable flow instabilities (e.g. chugging and spitting) and oscillations in the water levels in the system that are known to afflict the two-phase regime in the current state of the art direct steam generation solar thermal power plants with horizontal boiler tubes.

And still another method of flowing working fluid into the boiler tube 22 for heating, is by arranging the elevation of boiler tube 22 substantially the same as pressure vessel 24, as shown in FIG. 2. It is appreciated in this arrangement that at startup, the liquid fluid level in the boiler tube 22 will tend to be at equilibrium with the liquid fluid level in the pressure vessel 24, thereby raising the fluid level in the boiler tube 22 to a sufficiently high level to be heated by concentrated solar radiation. And during operation, the vertical height of the wet steam level 27 will typically lie below the water level 42 in the pressure vessel 24 while the vertical height of the dry steam level 28 will lie above water level 42. In between these two levels within boiler tube 22, saturated steam 21 consisting of a mixture of gas and liquid phase water is found. In this case too, the concentrated solar heating energy input to boiler tube 22 drives the working fluid in a clockwise flow (as shown in FIG. 2) from the bottom inlet end 90 of boiler tube 22 to the top outlet end 91 of boiler tube 22 to one or both of the inlet conduits 23, 92 into the pressure vessel 24, out through fluid duct 25 and back to the bottom of boiler tube 22. The arrows shown in FIG. 2 (including 67, 68, and 47, but not 29, 43, or 37) schematically illustrate this flow circuit.

As shown in FIG. 2 a flow restrictor 26 may also be used, either alone or in conjunction with the other methods previously described (e.g. the wick 93 and/or the exemplary inclined orientation of the boiler tube 22 in the present invention), to help stabilize fluid flow through the system. In particular, the flow restrictor 26 functions to minimize or eliminate backflow and provide a "fluidic diode action" to help control vigorous and potentially unstable oscillations in the water levels in the system and promote smooth clockwise flow. The flow restrictor 26 damps out this instability, since a rapid increase in liquid flow rate through the restrictor produces a pressure drop that in turn limits the rate of increase of the liquid flow rate.

An initially weak flow of steam 29 also fills the interior of conduit 30. Initially, while the walls of conduit 30 are below the steam temperature, vapor phase steam condenses on the walls and liquid water drips back down into pressure vessel 24. Similarly, while the upper portion of pressure vessel 24 remains below the steam temperature, some condensation occurs on the upper portion/headspace of vessel 24. It is appreciated that all such surfaces in contact with steam are thermally insulated, both to prevent undue loss of heat to the environment, and to prevent hazard to possible human contact. With continued heating, the water in tank 24 and the various surfaces in contact with steam come up to the designed operating steam temperature, and the pressure throughout pressure vessel 24, boiler tube 22 and conduit 30 rises to the designed operating steam pressure.

As long as the pressure is below the minimum operating pressure for expander 34, motor/generator 33 remains unconnected to the electrical grid 35, valve 48 remains closed, and steam is unable to pass through expander 34. Once the steam pressure exceeds the minimum operating pressure, the pressure sensitive actuator 31 causes pressure switch 32 to close, expander inlet valve 48 to open, and motor/generator 33 is connected to the grid. Initially, motor/generator 33 then acts as a starter motor, and turns the crankshaft of expander 34 and steam begins to flow through the expander. As the steam flows through expander 34, it begins to warm the interior surfaces of expander 34. Although some work is provided by the expansion of the steam, initially most of the work in turning over the expander is provided from the electric grid while the expander warms up. Soon, however, the expander comes to its steady state working temperature, and steam admitted to its inlet at high pressure is expanded, does work, and is exhausted from the expander at lower temperature and pressure. At this time, motor/generator 33 acts as a generator, and electrical power is delivered to the grid. By virtue of the operating characteristics of properly designed asynchronous induction motors, essentially only the amplitude of the electrical current varies, in response to the varying rate of incoming steam provided to expander 34. In contrast, the electrical output voltage is automatically generated in phase with the grid voltage, and with the pre-determined proper amplitude to match the grid connection 35. In addition, the frequency of the generated power is automatically synchronized to the frequency of the electric grid, by the nature of asynchronous induction motors, and is uncoupled from the operating frequency of the engine itself. Rather, the speed of generator 33 is configured to be self regulated to be just that speed required to deliver the grid electrical frequency. With a modest "slip" design, the actual generator mechanical frequency would be typically about 5% faster (at the maximum solar steam production rate) than the synchronous frequency corresponding to the 60 Hz (in the United States) of the electrical grid. It is appreciated that for connection to the public electrical grid, various safety cut-off features (not shown) would undoubtedly be required by the local electric utility company to prevent unexpected "live wire" conditions during a power grid outage.

The spent steam 43 from the exhaust of expander 34 then passes through condenser 36. For typical conditions, using water as the working fluid, the spent steam 43 emerging from the expander is wet, and it is preferred that the passages within condenser 36 are all "downhill", so that condensed liquid water 37 may easily drain into reservoir 38. It is also preferred that expander 34 is of a form that is tolerant of wet steam at the outlet end. It is notable that high performance turbines are not generally well suited for use as expanders in this case. Rather, expansible chamber types of expanders are preferred, such as a scroll expander known in the art, or properly drained reciprocating piston expanders, such as that described in Applicant's co-pending patent application Ser. No. 11/801,987, entitled "Harmonic Engine", incorporated by reference herein. The rejection of heat from condenser 36 may be directly to the ambient air, as shown in FIGS. 1 and 2, or may be to a water-cooling manifold (not shown). For locations having sufficiently cold weather, it may be economically advantageous to exploit such a water-cooling manifold as a contribution to the building space heating system (not shown).

At the end of the day, residual hot water within pressure vessel 24 may be drained to hot water reservoir 62 by opening valve 61 and allowing water to flow through sump conduit 60 by taking advantage of the residual steam pressure within vessel 24. This process enables dropping the pressure within tank 24 to nearly the value of the water pressure in hot water reservoir 62. Then momentarily opening valve 64 and allowing a certain quantity of fresh, cold water to flow in from reservoir 65, quenches the remaining residual pressure within tank 24. Once vessel 24 is thereby depressurized, check valve 39 may be forced open by the head of water between valve 39 and water surface level 59, and the condensed liquid water drains from reservoir 38 down into vessel 24. This final quenching of the pressure within vessel 24 that initiates the release of the condensed water from reservoir 38 may be delayed until the first morning solar heating is available. Similarly, the draining of residual hot water within tank 24 may be metered in proportion to the demand for space heating or hot water supply through the diurnal cycle, if desired, by only partially opening valve 61. Once reservoir 38 has completely drained into tank 24, the full diurnal cycle can repeat. Under normal conditions, the pressure cannot significantly exceed the level determined by pressure sensitive actuator 31. However, in the event that things go wrong, it is important to have a pressure safety valve 41 at the top of vessel 24, in order to prevent possible boiler explosions. However, since heating is only provided at the surface of boiler tube 22 rather than within pressure tank 24 itself, and means are provided to avoid "hot spots" as described above, there is little danger of a catastrophic boiler explosion.

As best seen in the embodiment illustrated in FIG. 3, as a result of the proper sizing of the water filling within vessel 24, the steam pressure increases very gradually, and the production of electricity may thus be delayed until the afternoon, in order to maximize the value of the generated power, in consideration of a Time of Delivery electric price contract. In order to precisely time the start of power production, it is only necessary to have the quantity of water be such that the absorbed solar heating raises the water to the design operating pressure at the time that power production is desired to commence. As an example, to have the onset of steam production be delayed until local noon, starting from a cold water temperature of 300 K, and with just sufficient water in vessel 24 to be completely evaporated over the course of the day, the operating pressure for the steam should be approximately 30 bar, and the operating temperature of the saturated water should be approximately 507 K. This example of noon-time power onset timing is meant to be a suggestive approximation, as some simplifying assumptions are made, such as neglecting possible cloud effects, or heat leakage effects.

It is appreciated that, once the temperature of the water in pressure vessel 24 at and above the level of the incoming steam 46 reaches the design boiling point, as water within vessel 24 is converted to steam and this steam is supplied to expander 34, the water level 42 drops. At some time during the day, assuming sufficient solar heating, water level 42 drops below the level of incoming steam 46, and the effectiveness of the heat transfer from incoming steam 46 to water in tank 24 decreases. In addition, as water level 42 drops, and with a fixed head of pressure produced by pump 56, so to does liquid level 27 within boiler tube 22. As a result, a certain degree of super-heating of steam can occur, and the temperature and pressure of steam flow 29 can gradually increase in the afternoon. This phenomenon leads to a peak power production that occurs some time after the peak solar illumination at local noon. This is particularly beneficial for Time of Delivery electric revenue generation, since the peak electric power consumption, especially in summer months, almost always occurs a number of hours after local noon.

In FIG. 3, an embodiment is shown wherein pressure vessel 24 is located well below the elevation of boiler tube 22. Such an arrangement is convenient for an installation wherein the pressure vessel 24 is near ground level, and the parabolic trough concentrator mirror is located at rooftop level. In this case, water pump 56 serves to supply the slight head of pressure to the water 49 entering pump 56 required to maintain the water level 27 in boiler tube 22 at the desired elevation above the water level 42 in vessel 24. In this type of embodiment, there is great freedom in the layout and arrangement of the various components of the system, with appropriate supplemental water pumps, similar to that shown here, placed where necessary to accommodate elevation differences. The operation of an embodiment such as that illustrated in FIG. 3 is in almost all regards parallel to the operation described for the embodiment shown in FIG. 2, with the exception that in the phase of operation corresponding to the draining of the hot water from boiler tube 22 and vessel 24 at the end of the day, it is desirable for water pump 56 to have an "open" mode, so that any water above it may drain through, and thus avoid a freezing hazard. It is simplest for pump 56 to go into "open" mode at sunset and exit from "open" mode at sunrise, although many variations on this approach will be readily apparent to one skilled in the art.

Figure 4:
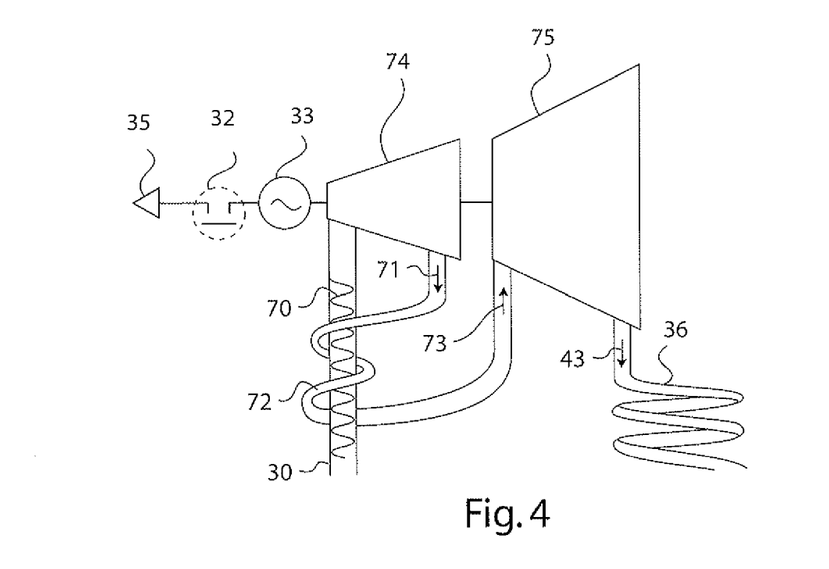
FIG. 4 is a schematic view of a third example embodiment of the present invention, with a reflux heat pipe used to reheat intermediate pressure working fluid between a first and second expander.

In FIG. 4, an example embodiment is shown employing a single stage of steam reheating, and illustrating a preferred connection of such a reheat subsystem within the context of the present invention. Here, steam 71 emerging from a high pressure expander 74 passes through reheating manifold 72 and accepts heat from steam passing through steam conduit 30. In contrast to the first embodiment described above, in which very little heat is lost from the steam 29 flowing to the expander, in the present case, by design, a considerable degree of heat transfer from steam flow 29 is desired, and it is preferable to have an enhanced liquid return means, such as the reheat wick 70, contained within steam conduit 30. Such enhanced heat transfer devices are well known in the art of heat pipes. The liquid condensed from steam flow 29 may then be effectively returned to pressure vessel 24 without significantly impeding the upward flow of gaseous steam 29. After reheating to nearly the temperature level of the water in vessel 24, but at reduced pressure, steam flow 73 enters a low pressure expander 75 and exits as spent steam 43 to condenser 36. In a similar fashion, additional stages of reheat can easily be incorporated, if desired, as will be apparent to one skilled in the art of steam power. It will also be apparent to one skilled in the art that the successive lower pressure expanders may be operated completely outside the two phase region of the phase diagram of water, and as a result, for these lower pressure expanders 75, the familiar turbine form of expander may readily be employed in contrast to the expansible chamber type of expander preferred for 74.

Figure 5:
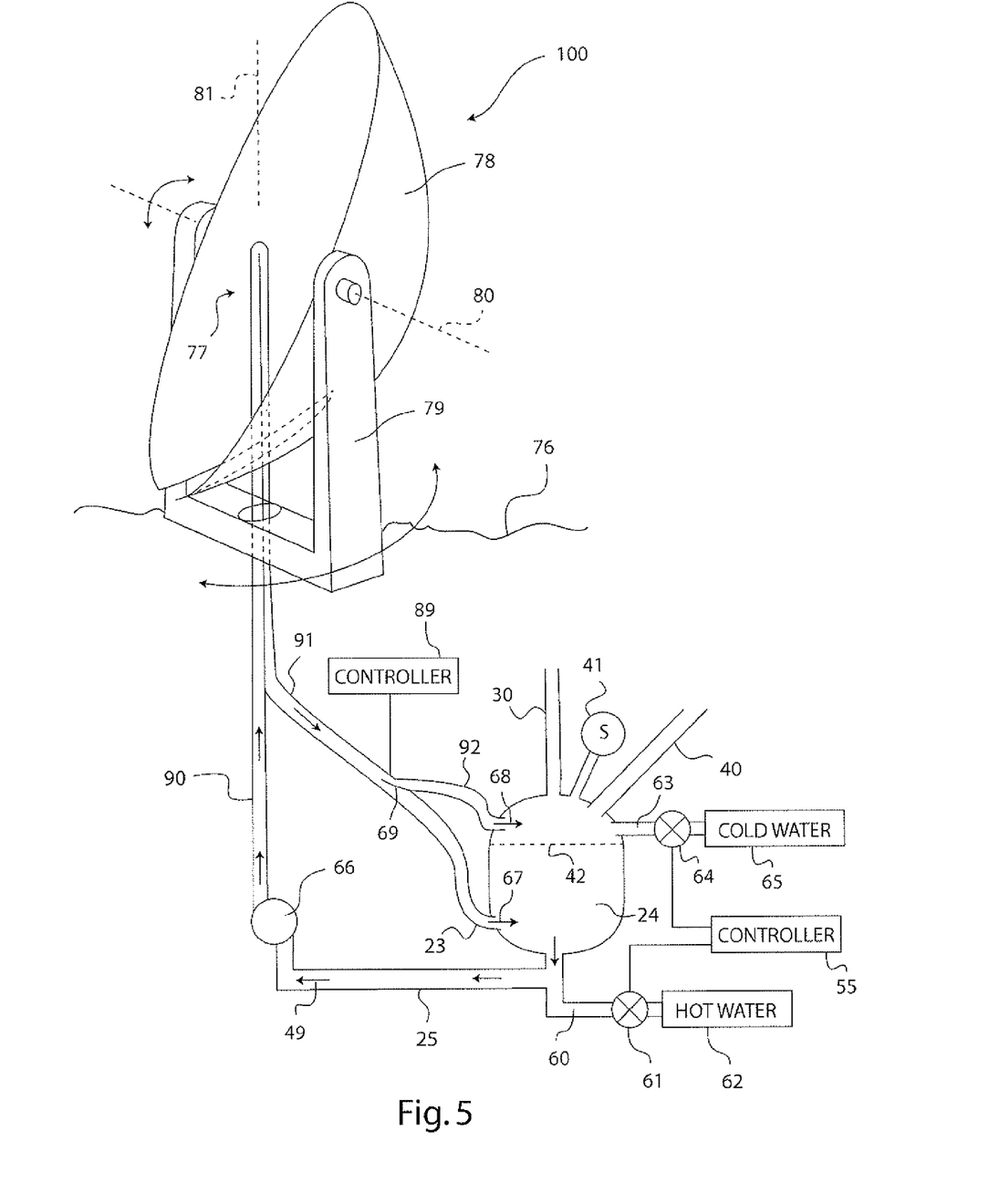
FIG. 5 is a schematic view of a fourth example embodiment of the present invention having a parabolic dish concentrator mirror heating assembly as the solar concentrator.

In FIG. 5, an example embodiment is illustrated employing a parabolic dish solar concentrator, generally indicated at 100, rather than the parabolic trough concentrator of the first example embodiment. The dish concentrator is preferred under conditions of higher temperature and pressure operation of the present invention, such that radiative losses from the extended surface area of the parabolic trough boiler tube would become unacceptably high relative to the desired heating power. As shown in FIG. 5, a stationary vertical boiler manifold 77, which may be characterized as a type of boiler tube that is particularly arranged so that solar radiation is focused at a point location (i.e. focal point region) instead of along a focal axis, extends up into the focus of parabolic dish concentrating mirror 78. The focal point region of the vertical boiler manifold 77 coincides with the focal point of the parabolic dish concentrating mirror. And the focal point of the parabolic dish concentrating mirror is preferably stationary with respect to the ground surface 76, so that the vertical boiler manifold 77 (especially the focal point region thereof) can remain rigidly fixed in position. Over the course of the day, mirror 78 is preferably positioned by means of an altitude-azimuth mount 79 of a sort familiar to amateur astronomers. A rotation about the altitude axis 80 enables mirror to track the elevation of the sun through the course of the day, while a rotation about azimuth axis 81 similarly enables tracking the azimuthal direction to the sun. The figure of parabolic concentrating mirror 78 is chosen to place the focus at the intersection of the altitude axis 80 and the azimuth axis 81, so that the focus stays fixed with respect to the ground regardless of the orientation of the mirror as it is positioned to follow the sun and maintain concentrated solar heating directed towards the tip of vertical boiler manifold 77. In this embodiment, with high pressure, high temperature steam typically involved, it is preferable for the pressure vessel 24, at least, to be located underneath the ground level 76, as indicated in FIG. 5, for both safety reasons, and for supplemental thermal insulation reasons. In addition, for noise isolation and esthetic reasons, the expander mechanisms may also be located underground.

The operation of the embodiment shown in FIG. 5 is similar to that discussed for the first example embodiment of FIGS. 1 and 2, and therefore the same reference characters are used to indicate other component parts of the solar thermal power system that are connected to the parabolic dish concentrator 100. However, it is notable that during operation of the embodiment shown in FIG. 5, the speed of water pump 66 is chosen to maintain a mass flow rate that is greater than the rate of vaporization of water under the most intense solar illumination conditions, typically at local noon in mid-summer. In the absence of solar heating, the motion of water within the vertical boiler tube resembles that of a small water drinking fountain, while even under the most intense solar heating, the focal point region of the vertical boiler manifold 77 is prevented from drying out, and possibly burning. As in the first example embodiment earlier described, as the working pressure rises above the design operating threshold, high pressure steam is then made available to the expander, just as described above.

It is appreciated that for packaging reasons it may be preferable for multiple solar concentrating mirror assemblies to be configured in parallel to feed a single pressure vessel. It is appreciated that it may be preferable to have separate, parallel condenser assemblies, with one set of condensers positioned outside a residential structure for the dissipation of heat to the environment during the summer, and with a second set of condensers positioned inside the residential structure for the delivery of heat to the residence during the winter.

It is appreciated that, although a hermetically sealed system is desirable, so that virtually no fluid leaks form the system, in some cases a more economical system can be fabricated by allowing minor working fluid leakage, and that in such a case, minor leakage can be replenished with a working fluid makeup sub-system. This is most feasible with a non-hazardous working fluid, such as water. It is appreciated that alternative working fluids, such as those known to be useful for so-called Organic Rankine Cycles, may be most appropriate in some applications, but that in most such cases, it would be imperative to have a hermetically sealed system. In the case of alternative working fluids, it is appreciated that a different range of operating temperatures and pressures would be involved in a system designed to store all of the morning's heat for conversion to power in the afternoon. Such design considerations would be easy for one skilled in the art to appreciate.

I claim:

1. A solar thermal power generator comprising:
a pressure vessel for storing a thermally-induced phase-changing working fluid;
a boiler tube having an inlet end operably connected to receive a liquid phase of the working fluid from the pressure vessel, and an outlet end operably connected to return a gaseous phase of the working fluid back to the pressure vessel at an entry point below a predetermined initial liquid-phase working fluid level thereof to directly preheat the liquid phase working fluid contained therein until the liquid-phase working fluid level falls below the entry point in the course of being supplied to the inlet end of the boiler tube, wherein the entry point into the pressure vessel is located a predetermined distance below the initial liquid-phase working fluid level to cause a predetermined delay between the onset of solar heating and a maximum pressure level within the pressure vessel;
a solar concentrator for concentrating solar energy on the boiler tube to thermally induce a phase change of the working fluid therein from the liquid phase to the gaseous phase;
an expander operably connected to the pressure vessel to produce work using the gaseous phase working fluid received therefrom;
a condenser operably connected to the expander to condense the expanded working fluid received therefrom;
a collection vessel operably connected to the condenser to collect the condensed working fluid received therefrom, and operably connected to the pressure vessel to intermittently supply the collected working fluid back thereto at the end of each diurnal cycle.

2. The solar thermal power generator of claim 1, further comprising means for flowing the liquid phase working fluid from the pressure vessel into the boiler tube.

3. The solar thermal power generator of claim 2, wherein said means for flowing the liquid phase working fluid from the pressure vessel into the boiler tube comprises at least one: of a pump operably connected inline between the pressure vessel and the inlet end of the boiler tube for pumping the working fluid from the pressure vessel to the boiler tube, a wick positioned in the boiler tube, and a substantially similar elevational arrangement between the boiler tube and the pressure vessel.

4. The solar thermal power generator of claim 3, further comprising a flow restrictor operably connected inline between the pressure vessel and the inlet end of the boiler tube to prevent backflow.

5. The solar thermal power generator of claim 1, wherein the boiler tube has an inclined orientation with the outlet end having a higher elevation than the inlet end.

6. The solar thermal power generator of claim 5, wherein the inclined boiler tube is oriented parallel to the Earth's rotation axis.

7. The solar thermal power generator of claim 1, further comprising:
a valve operably connected inline between the pressure vessel and the expander for controlling the flow of the gaseous-phase working fluid therebetween; and
a pressure sensor operably connected to detect the line pressure from the pressure vessel to the valve, and to open the valve above a pre-determined line pressure level.

8. The solar thermal power generator of claim 1, further comprising:
an induction motor operably connected to drive or be driven by the expander.

9. The solar thermal power generator of claim 8, further comprising:
a switch for controlling the connection of the induction motor to a power grid; and
a pressure sensor operably connected to detect the line pressure from the pressure vessel to the expander, and to close the switch above a pre-determined line pressure level to provide power from the induction motor to the power grid.

10. The solar thermal power generator of claim 1, further comprising:

at least one additional expander(s) operably connected inline between the first expander and the condenser; and for each adjacent pair of expanders, a reheat manifold for capturing heat from a flow line supplying gaseous-phase working fluid from the pressure vessel to the first expander, said reheat manifold operably connected inline between the adjacent pair of expanders so that expanded working fluid exhausted from an upstream one of the adjacent pair of expanders is reheated prior to entering the downstream one thereof.

11. The solar thermal power generator of claim 1, further comprising:

a vacuum pump operably connected to the collection vessel for removing excess air therefrom.

12. The solar thermal power generator of claim 1, further comprising:

a check valve operably connected inline between the collection vessel and the pressure vessel to occlude flow of the condensed working fluid from the collection vessel back to the pressure vessel during daytime operation while the line pressure between the pressure vessel and the collection vessel remains above a pre-determined line pressure level due to solar heating of the working fluid and to enable flow otherwise, for intermittently supplying the pressure vessel with the condensed working fluid at the end of each diurnal cycle.

13. The solar thermal power generator of claim 1, further comprising:

a tap valve operably connected to the pressure vessel for controlling the release of working fluid therefrom; and a feed valve operably connected to the pressure vessel and operably connectable to an external source of the working fluid for controlling the influx of working fluid into the pressure vessel.

14. The solar thermal power generator of claim 13, further comprising:

a controller operably connected to the tap valve and the feed valve to coordinate operations thereof.

15. The solar thermal power generator of claim 14, further comprising:

a vacuum source operably connected to the collection vessel for removing excess air therefrom; and a vacuum source valve operably connected inline between the vacuum source and the collection vessel, said controller operably connected to the vacuum source valve to coordinate operation thereof with the tap valve and the feed valve.

16. A solar thermal power generator comprising:

a pressure vessel for storing a thermally-induced phase-changing working fluid;

a boiler tube having an inlet end operably connected to receive a liquid phase of the working fluid from the pressure vessel, and an outlet end operably connected to return a gaseous phase of the working fluid back to the pressure vessel to preheat the liquid phase working fluid contained therein;

a first fluid conduit fluidically connected to channel gaseous-phase working fluid from the outlet end of the boiler tube to the pressure vessel below a pre-determined initial liquid-phase working fluid level in the pressure vessel;

a second first fluid conduit fluidically connected to channel gaseous-phase working fluid from the outlet end of the boiler tube to the pressure vessel above the pre-determined initial liquid-phase working fluid level in the pressure vessel;

a controller for apportioning the gaseous phase working fluid flowing out from the outlet end of the boiler tube between the first and second fluid conduits;

a solar concentrator for concentrating solar energy on the boiler tube to thermally induce a phase change of the working fluid therein from the liquid phase to the gaseous phase;

an expander operably connected to the pressure vessel to produce work using the gaseous phase working fluid received therefrom;

a condenser operably connected to the expander to condense the expanded working fluid received therefrom; and a collection vessel operably connected to the condenser to collect the condensed working fluid received therefrom, and operably connected to the pressure vessel to intermittently supply the collected working fluid back thereto at the end of each diurnal cycle.

17. The solar thermal power generator of claim 16, further comprising:

a check valve operably connected inline between the collection vessel and the pressure vessel to occlude flow of the condensed working fluid from the collection vessel back to the pressure vessel during daytime operation while the line pressure between the pressure vessel and the collection vessel remains above a pre-determined line pressure level due to solar heating of the working fluid and to enable flow otherwise, for intermittently supplying the pressure vessel with the condensed working fluid at the end of a diurnal cycle.

18. The solar thermal power generator of claim 17, further comprising:

a tap valve operably connected to the pressure vessel for controlling the release of working fluid therefrom;

a feed valve operably connected to the pressure vessel and operably connectable to an external source of the working fluid for controlling the influx of working fluid into the pressure vessel; and a second controller operably connected to the tap valve and the feed valve to depressurize the pressure vessel to below the predetermined line pressure level at the end of each diurnal cycle by performing at least one of draining residual working fluid out through the tap valve and feeding cooler working fluid in through the feed valve.

19. The solar thermal power generator of claim 18, further comprising:

a vacuum source operably connected to the collection vessel for removing excess air therefrom; and a vacuum source valve operably connected inline between the vacuum source and the collection vessel, said second controller operably connected to the vacuum source valve to coordinate operation thereof with the tap valve and the feed valve to depressurize the pressure vessel to below the predetermined line pressure level at the end of the diurnal cycle.

20. A solar thermal power generator comprising:

a pressure vessel for storing a thermally-induced phase-changing working fluid;

a boiler tube having an inlet end operably connected to receive a liquid phase of the working fluid from the pressure vessel, and an outlet end operably connected to return a gaseous phase of the working fluid back to the pressure vessel to preheat the liquid phase working fluid contained therein;

a solar concentrator for concentrating solar energy on the boiler tube to thermally induce a phase change of the working fluid therein from the liquid phase to the gaseous phase;

an expander operably connected to the pressure vessel to produce work using the gaseous phase working fluid received therefrom;

a condenser operably connected to the expander to condense the expanded working fluid received therefrom;

a collection vessel operably connected to the condenser to collect the condensed working fluid received therefrom, and operably connected to the pressure vessel to supply the collected working fluid back thereto; and a check valve operably connected inline between the collection vessel and the pressure vessel to occlude flow of the condensed working fluid from the collection vessel back to the pressure vessel during daytime operation while the line pressure between the pressure vessel and the collection vessel remains above a pre-determined line pressure level due to solar heating of the working fluid and to enable flow otherwise, for intermittently supplying the pressure vessel with the condensed working fluid at the end of each diurnal cycle.

21. The solar thermal power generator of claim 20, further comprising:

a tap valve operably connected to the pressure vessel for controlling the release of working fluid therefrom;

a feed valve operably connected to the pressure vessel and operably connectable to an external source of the working fluid for controlling the influx of working fluid into the pressure vessel; and a second controller operably connected to the tap valve and the feed valve to depressurize the pressure vessel to below the predetermined line pressure level at the end of each diurnal cycle by performing at least one of draining residual working fluid out through the tap valve and feeding cooler working fluid in through the feed valve.

* * * * *